US010148352B1

(12) United States Patent
Yang et al.

(10) Patent No.: US 10,148,352 B1
(45) Date of Patent: Dec. 4, 2018

(54) CONTINUOUS CARRIER OPTICAL PHASE OPTOMETRIC MEASUREMENT OVER COHERENT OPTICAL COMMUNICATION LINK

(71) Applicant: The United States of America as represented by the Administrator of the National Aeronautics and Space Administration, Washington, DC (US)

(72) Inventors: Guangning Yang, Clarksville, MD (US); Jeffrey R. Chen, Clarksville, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/646,687

(22) Filed: Jul. 11, 2017

(51) Int. Cl.
| | |
|---|---|
| *H04B 10/08* | (2006.01) |
| *H04J 14/00* | (2006.01) |
| *H04B 10/079* | (2013.01) |
| *H04B 10/61* | (2013.01) |
| *H04L 7/00* | (2006.01) |
| *H04B 7/185* | (2006.01) |

(Continued)

(52) U.S. Cl.
CPC ............. *H04B 10/079* (2013.01); *B64G 3/00* (2013.01); *G01S 17/36* (2013.01); *G01S 17/933* (2013.01); *H04B 7/18506* (2013.01); *H04B 10/071* (2013.01); *H04B 10/503* (2013.01); *H04B 10/61* (2013.01); *H04J 14/00* (2013.01); *H04L 7/0075* (2013.01); *G08B 13/08* (2013.01)

(58) Field of Classification Search
CPC . H04L 7/0075; H04B 10/079; H04B 7/18506; H04B 10/503; H04B 10/61; H04B 1/40; H04B 7/00; G01S 17/933; G01S 17/36; G01S 1/00; B64G 3/00; G01C 3/06; G01P 3/36; A61B 8/00; G01N 29/44; H04J 3/16; H04W 64/00
USPC .............................................. 398/25, 66, 70
See application file for complete search history.

(56) References Cited

U.S. PATENT DOCUMENTS

| | | | | |
|---|---|---|---|---|
| 6,243,369 B1 * | 6/2001 | Grimwood | ............ | H04J 3/0682 370/335 |
| 6,867,693 B1 * | 3/2005 | Radin | ....................... | G01S 5/14 340/539.1 |

(Continued)

*Primary Examiner* — Ken N Vanderpuye
*Assistant Examiner* — Abbas H Alagheband
(74) *Attorney, Agent, or Firm* — Christopher O. Edwards; Bryan A. Geurts; Mark P. Dvorscak

(57) ABSTRACT

An apparatus for measuring a distance between a first and second terminal includes a frame counter for determining a number of data frames traversing a distance between the first terminal 105 and the second terminal, a frame bit counter for determining a number of data clock bits offset between a transmitted data frame and a concurrently received data frame, a data clock phase detector for determining a phase difference between an RF data clock for the transmitted data frame and an RF data clock for the concurrently received data frame, and an optical carrier phase detector for determining a phase difference between an optical carrier used to transmit the transmitted data frame and an optical carrier for the concurrently received data frame. The distance between the first and second terminal is determined from a round trip transit time T between the first and second terminals.

18 Claims, 4 Drawing Sheets

(51) Int. Cl.
*H04B 10/50* (2013.01)
*G01S 17/36* (2006.01)
*G01S 17/93* (2006.01)
*B64G 3/00* (2006.01)
*H04B 10/071* (2013.01)
*G08B 13/08* (2006.01)

(56) References Cited

U.S. PATENT DOCUMENTS

| | | | | |
|---|---|---|---|---|
| 6,961,348 B2* | 11/2005 | Yu | ............................ | H04L 29/06 370/466 |
| 7,463,626 B2* | 12/2008 | Roy | ....................... | H04J 3/0685 370/388 |
| 7,536,152 B2* | 5/2009 | Inano | ................... | G06K 7/0008 340/10.2 |
| 7,936,271 B2* | 5/2011 | Karr | ........................... | G01S 5/14 340/539.13 |
| 8,331,784 B2* | 12/2012 | Mizutani | ............... | H04J 3/0655 398/154 |
| 8,384,584 B2* | 2/2013 | Karr | ....................... | G01S 13/325 342/44 |
| 9,223,003 B2* | 12/2015 | Segev | ................... | G01S 5/0027 |
| 9,398,412 B2* | 7/2016 | Prechner | ................... | G01S 5/14 |
| 2001/0033611 A1* | 10/2001 | Grimwood | ............ | H04J 3/0682 375/219 |
| 2003/0091035 A1* | 5/2003 | Roy | ....................... | H04J 3/0685 370/353 |
| 2007/0167139 A1* | 7/2007 | Inano | ................... | G06K 7/0008 455/88 |
| 2008/0110263 A1* | 5/2008 | Klessel | ............... | G01S 7/52028 73/602 |
| 2008/0114252 A1* | 5/2008 | Randall | ............... | G01S 7/52028 600/447 |
| 2008/0114255 A1* | 5/2008 | Schwartz | ................. | A61B 8/00 600/474 |
| 2009/0162065 A1* | 6/2009 | Mizutani | ............... | H04J 3/0655 398/66 |
| 2009/0201152 A1* | 8/2009 | Karr | ........................ | G01S 5/14 340/545.6 |
| 2011/0019996 A1* | 1/2011 | Boduch | ............... | H04B 10/071 398/30 |
| 2012/0146834 A1* | 6/2012 | Karr | ....................... | G01S 13/325 342/47 |
| 2014/0171109 A1* | 6/2014 | Segev | ................... | G01S 5/0027 455/456.1 |
| 2016/0139236 A1* | 5/2016 | Segev | ................... | G01S 5/0027 455/456.1 |
| 2018/0183525 A1* | 6/2018 | Capriata | ............... | H04B 10/2507 |

* cited by examiner

CONTINUOUS CARRIER OPTICAL PHASE OPTOMETRIC MEASUREMENT OVER COHERENT OPTICAL COMMUNICATION LINK

INVENTION BY GOVERNMENT EMPLOYEE(S) ONLY

The invention described herein was made by one or more employees of the U.S. Government, and may be manufactured and used by or for the Government for governmental purposes without the payment of any royalties thereon or therefor.

BACKGROUND

The disclosed embodiments generally relate to laser optical ranging, and in particular, to using a coherent optical communication link for laser optical ranging and range rate measurements.

Ranging and range rate measurements are important parameters in spacecraft navigation and tracking. Because of the distances between space craft, between a terrestrial body and a spacecraft, or between terrestrial bodies, for example, Earth and Mars, accurate range and range rate measurements are difficult to achieve. Traditionally, these measurements are accomplished by measuring a Doppler shift of a microwave carrier that provides a target velocity along a line of sight. An exemplary Doppler tracking system may utilize a two-way X band (7.2-8.4 GHz) radio link to achieve average measurement accuracy ranges from 100 to 20 um/s at a 60 s integration time. Such RF based systems are subject to interference from various types of noise, in particular, the solar wind and plasma scintillation noise.

It would be advantageous to improve provide a system that provides communication at a high data rate, accurate pointing capability, and more precise ranging and range rate measurements with lower interference, while adding minimal cost over existing optical communication systems.

SUMMARY

The disclosed embodiments are directed to an apparatus for measuring a distance between a first and second terminal. The apparatus includes a frame counter for determining a number of data frames traversing a distance between the first terminal 105 and the second terminal, a frame bit counter for determining a number of data clock bits offset between a transmitted data frame and a concurrently received data frame, a data clock phase detector for determining a phase difference between an RF data clock for the transmitted data frame and an RF data clock for the concurrently received data frame, and an optical carrier phase detector for determining a phase difference between an optical carrier used to transmit the transmitted data frame and an optical carrier for the concurrently received data frame. The distance between the first and second terminal is determined from a round trip transit time T between the first and second terminals expressed as:

$$T = N_{frame} \times T_{frame} + N_{bit} \times T_{bit} + \Delta \text{Data Clock Phase} + \Delta \text{Carrier Phase,}$$

where $N_{frame}$ is the number of frames traversing the distance between the first terminal 105 and the second terminal 110, $T_{frame}$ is the frame period, $N_{bit}$ is the number of RF data clock bits offset between the presently transmitted frame and the presently received data frame, $T_{bit}$ is the period of the RF data clock, $\Delta$ Data Clock Phase is the phase difference between the transmitted RF data clock and the received data clock, and $\Delta$ Carrier Phase is the phase difference between the transmitted optical carrier and the received optical carrier.

The apparatus may include an RF frequency synthesizer for generating the RF data clock.

The apparatus may also include a pattern generator for generating data for the data frames.

The apparatus may further include a source of communication data for generating data for the data frames.

The apparatus may still further include an optical frequency synthesizer for generating the optical carrier.

The optical carrier may be a coherent optical communications carrier.

The first terminal may be a ground terminal and the second terminal may be a space terminal.

The first and second terminals may be located on different space craft.

The first and second terminals may be located on different terrestrial bodies.

The disclosed embodiments are also directed to an method for measuring a distance between a first and second terminal. The method includes determining a number of data frames traversing a distance between the first terminal 105 and the second terminal, determining a number of data clock bits offset between a transmitted data frame and a concurrently received data frame, determining a phase difference between an RF data clock for the transmitted data frame and an RF data clock for the concurrently received data frame, determining a phase difference between an optical carrier used to transmit the transmitted data frame and an optical carrier for the concurrently received data frame, and calculating the distance between the first and second terminal from a round trip transit time T between the first and second terminals expressed as:

$$T = N_{frame} \times T_{frame} + N_{bit} \times T_{bit} + \Delta \text{Data Clock Phase} + \Delta \text{Carrier Phase,}$$

where $N_{frame}$ is the number of frames traversing the distance between the first terminal 105 and the second terminal 110, $T_{frame}$ is the frame period, $N_{bit}$ is the number of RF data clock bits offset between the presently transmitted frame and the presently received data frame, $T_{bit}$ is the period of the RF data clock, $\Delta$ Data Clock Phase is the phase difference between the transmitted RF data clock and the received data clock, and $\Delta$ Carrier Phase is the phase difference between the transmitted optical carrier and the received optical carrier.

The method may include generating the RF data clock using an RF frequency synthesizer.

The method may also include generating data for the data frames using a pattern generator.

The method may further include generating data for the data frames using a source of communication data.

The method may still further include generating the optical carrier using an optical frequency synthesizer.

The optical carrier may be a coherent optical communications carrier.

The method may include locating the first terminal terrestrially and locating the second terminal in space.

The method may also include locating the first and second terminals on different space craft.

The method may further include locating the first and second terminals on different terrestrial bodies.

BRIEF DESCRIPTION OF THE DRAWINGS

The foregoing aspects and other features of the embodiments are explained in the following description, taken in connection with the accompanying drawings, wherein.

DETAILED DESCRIPTION

Figure 1:
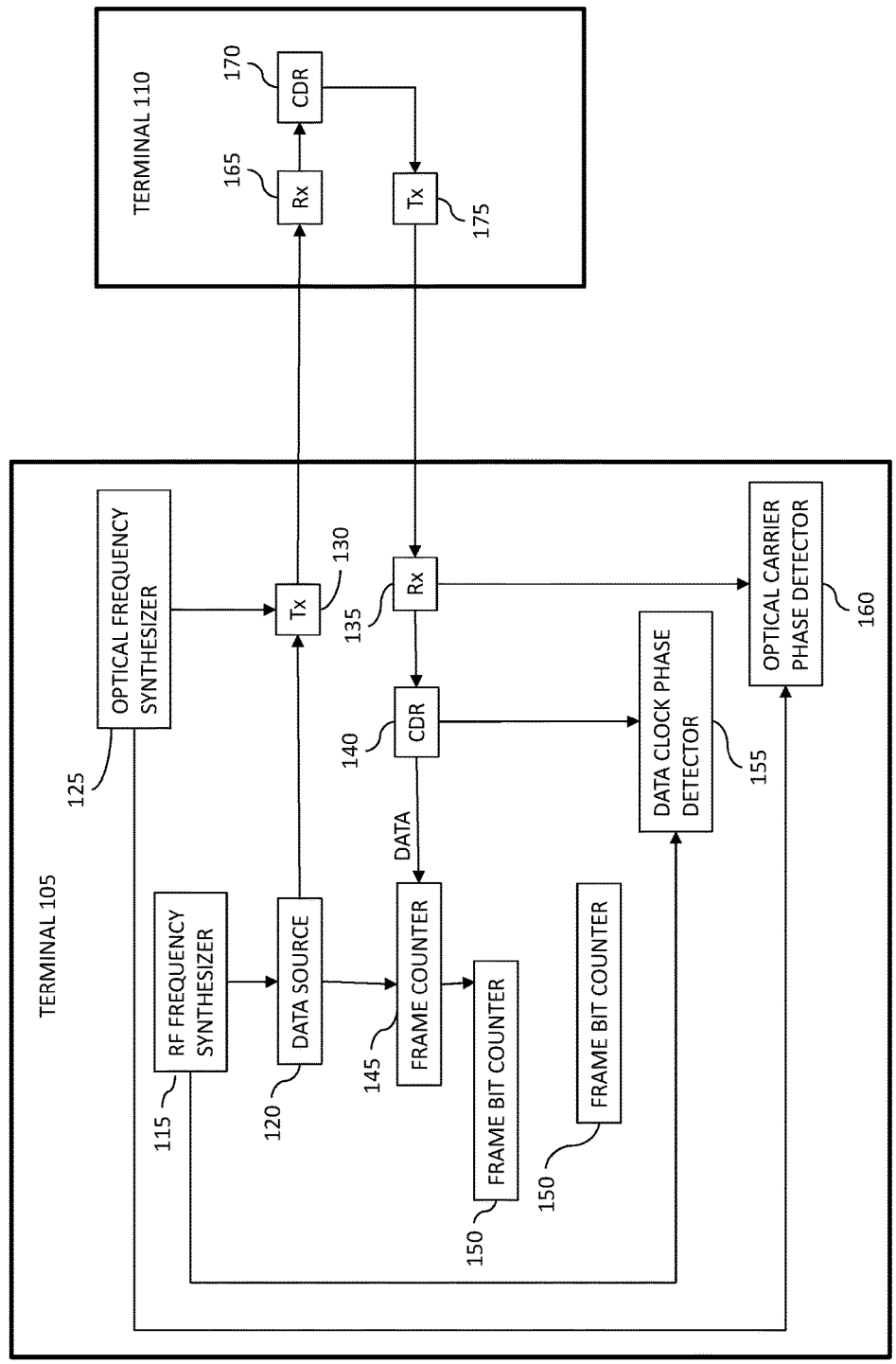
FIG. 1 illustrates an example of an optical system according to the disclosed embodiments.

Although the disclosed embodiments will be described with reference to the embodiments shown in the drawings and described below, it should be understood that these could be embodied in many alternate forms. In addition, any suitable size, shape or type of elements or materials could be used.

The disclosed embodiments are directed to using continuous carrier optical phase measurements over a coherent optical communications link, such as a laser link, to provide improved accuracy on range and range rate, particularly when compared to direct modulated optical ranging, where measurement is performed over a radio frequency (RF) data clock. Optical phase measurements over a coherent optical communications link provide an orders of magnitude improvement in accuracy due to the use of the much higher optical carrier frequency. The optical carrier laser frequency also provides for an increased data rate, while the coherence of the optical link provides a more accurate pointing capability.

FIG. 1 illustrates an example of an optical system 100 according to the disclosed embodiments. The optical system 100 may include a first terminal 105 and a second terminal 110. In some embodiments, the first terminal 105 may be a ground or terrestrial terminal, and the second terminal 110 may be a space terminal, such as a satellite. In other embodiments, the first and second terminals may be located on different space craft, or may be located on different terrestrial bodies, for example, different planets.

The first terminal 105 may include an RF frequency synthesizer 115, a data source 120, an optical frequency synthesizer 125, and a first optical transmitter 130. The first terminal may also include a first optical receiver 135, a first clock data recovery circuit 140, a frame counter 145, a frame bit counter 150, a data clock phase detector 155, and an optical carrier phase detector 160.

The second terminal may include a second optical receiver 165, a second clock data recovery circuit 170, and a second optical transmitter 175.

The RF frequency synthesizer 115 in the first terminal 105 may be a digital phase locked loop synthesizer, an analog phase locked loop synthesizer, a multi-loop phase locked loop synthesizer or any other suitable RF frequency synthesizer. The RF frequency generator 115 may generate an RF data clock at a suitable frequency, for example, approximately 622 MHz. One output of the RF frequency synthesizer 115 may be coupled to the data clock phase detector 155 and another output may be connected to the data source 120. The data source 120 may generate frames of data embedded with the RF data clock. In some embodiments, the data source 120 may be a pattern generator and the data may be a data pattern, while in other embodiments the data source 120 may be a source of communication data and the data may be a communication transmission. The source of communication data may include one or more of a user interface, an automatic control mechanism or processor or any suitable source of commands or data exchanged with the second terminal. The data frames may all have the same period. The data frames embedded with the RF data clock may be converted to a first optical signal by the first optical transmitter 130, which may be driven by an optical signal from the optical frequency synthesizer 125. In some embodiments, the optical frequency synthesizer 125 may include a master laser controlled by an atomic cell feedback loop for stability.

The first optical transmitter 130 may then transmit the first optical signal to the second terminal 110.

In the second terminal 110, the second optical receiver 165 may receive the first optical signal and may convert the received first optical signal to an electrical signal which is provided to the second clock recovery circuit 170. The second clock recovery circuit 170 may recover the RF data clock and the data frames, and may realign the data frames with the RF data clock. The realigned data frames and the recovered RF data clock may then be converted to a second optical signal and transmitted back to the first terminal 105 by the second transmitter 175.

In the first terminal 105, the first optical receiver 135 may receive the second optical signal and, for one output, may convert the second optical signal to an electrical signal provided to the first clock data recovery circuit 140. The first optical receiver 135 may have another output that may provide an optical signal corresponding to the received carrier of the second optical signal to the optical carrier phase detector 160. The first clock recovery circuit 140 may recover received data frames and a received RF data clock from the second optical signal and may provide the received data frames to the frame counter 145, and may also provide the received RF data clock to the data clock phase detector 155.

Figure 2:
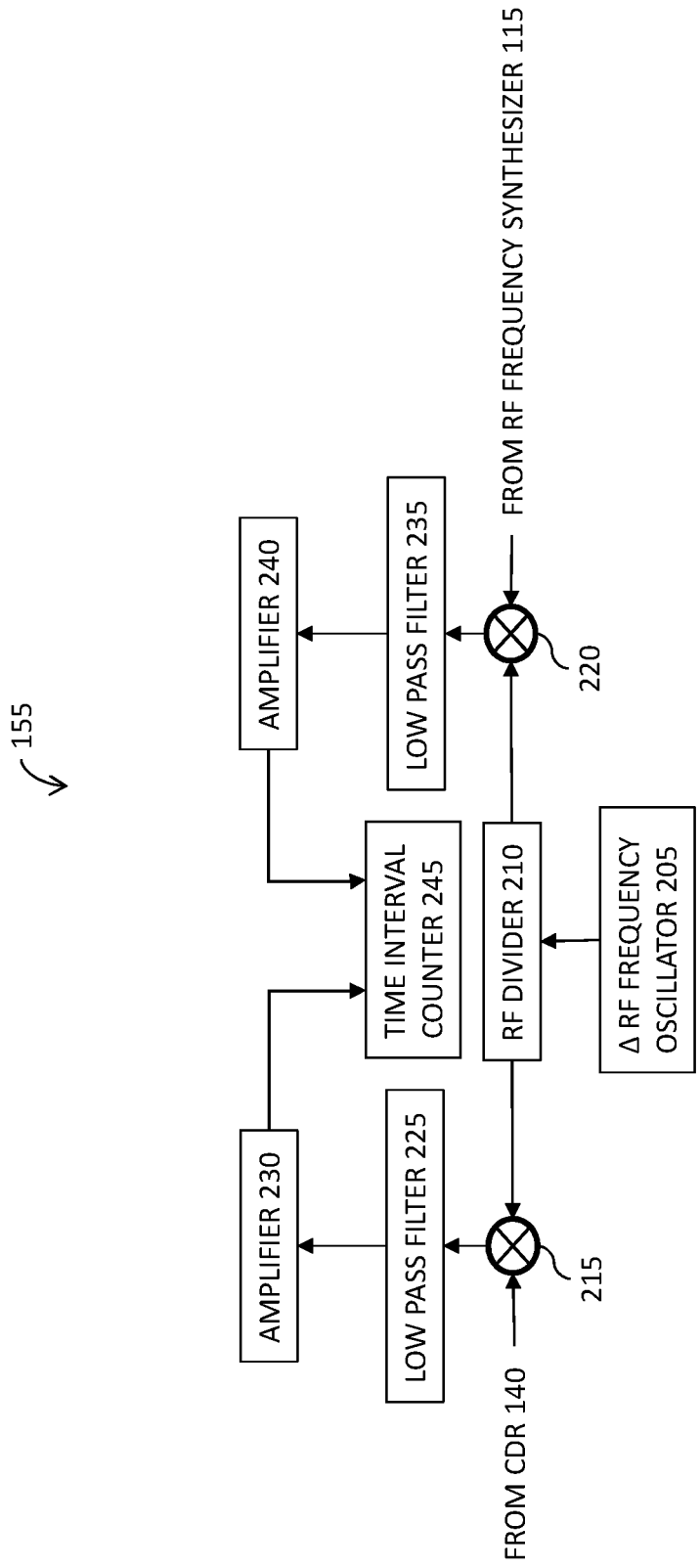
FIG. 2 illustrates a data clock phase detector according to the disclosed embodiments.

FIG. 2 shows a more detailed view of the data clock phase detector 155. It should be understood that the illustrated data clock phase detector 155 is exemplary and that any suitable structure or technique may be used to measure the difference between the phase of the data clock provided by the RF frequency synthesizer 115 and the data clock recovered from the signal transmitted by the second terminal 110. In this embodiment, the data clock phase detector 155 may be implemented as a dual mixer time difference measurement apparatus. The dual mixer time difference measurement apparatus may include a Δ RF frequency oscillator 205 having a frequency output offset from the frequency output by the RF frequency synthesizer 115, for example, approximately 1 KHz. The output of the Δ RF frequency oscillator 205 may be divided by RF divider 210 and both the clock from the first clock recovery circuit 140 and the clock from the RF frequency synthesizer 115 may be mixed with the resulting RF signal, using RF mixers 215 and 220, respectively. The mixed signal from the first clock recovery circuit 140 may be filtered by low pass filter 225 and amplified by amplifier 230, while the mixed signal from the RF frequency synthesizer 115 may be filtered by low pass filter 235 and amplified by amplifier 240. A time interval counter 245 may be used to measure the difference between the phase of the data clock provided by the RF frequency synthesizer 115 and the data clock recovered from the signal transmitted by the second terminal.

Figure 3:
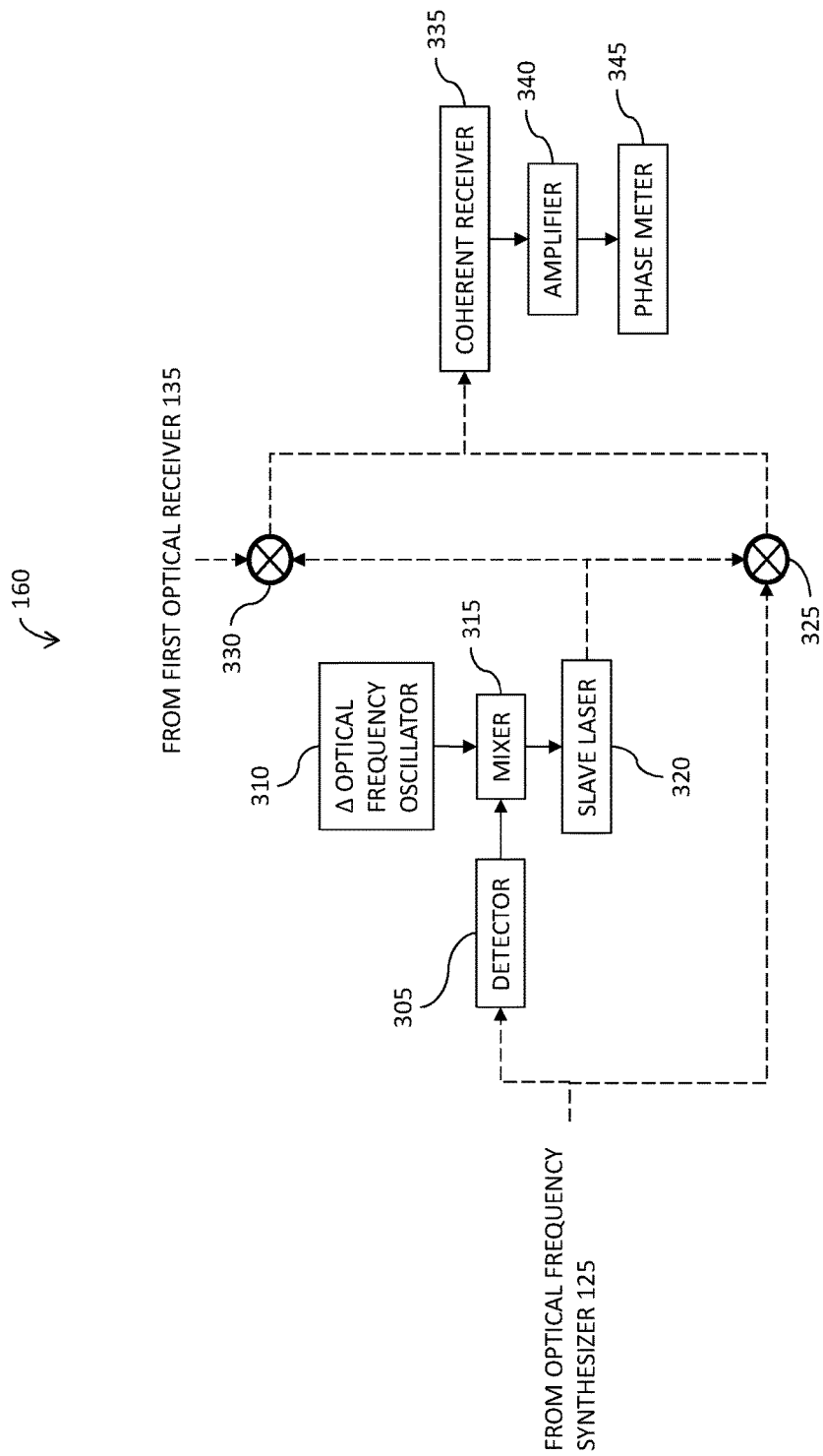
FIG. 3 illustrates an optical carrier phase detector according to the disclosed embodiments.

FIG. 3 shows a more detailed view of an optical carrier phase detector 160. The optical carrier phase detector 160 may be implemented using any number of suitable techniques, including but not limited to a phase shift method, a frequency modulation method, and also may be implemented using an interferometer. In the disclosed embodiments, an optical output from the optical frequency synthesizer 125 may be converted to an electrical signal by a detector 305 and may be mixed with an output from a Δ optical frequency oscillator 310 using mixer 315. The Δ optical frequency oscillator 310 may have a frequency output offset from the frequency output of the optical frequency synthesizer 125, for example, by approximately 10 MHz. The electrical output of the mixer 315 may be used to drive a slave laser 320. The slave laser 320 may output an optical signal having the frequency of the optical frequency synthesizer 125 plus the offset. The output of the slave laser 320 may be mixed with the output of the optical frequency synthesizer 125 using optical mixer 325, and may be mixed with the output of the first optical receiver 135 using optical mixer 330. The outputs of the optical mixers 325, 330 may be converted to an electrical output by coherent receiver 335, which may be amplified by amplifier 340. The output of amplifier 340 may be provided to phase meter 345 which may determine the phase difference between the optical carrier generated by the optical frequency synthesizer 125 and transmitted by the first optical transmitter 130, and the optical carrier received by the first optical receiver 135.

Returning to FIG. 1, in the first terminal, at least four parameters may be measured: The number of data frames traversing the distance between the first terminal 105 and the second terminal 110; the number of RF data clock bits offset between the presently transmitted frame and the presently received data frame; the phase difference between the transmitted RF data clock and the received RF data clock, and the phase difference between the transmitted optical carrier and the received optical carrier.

The round trip transit time between the first and second terminals T may be expressed as:

$$T = N_{frame} \times T_{frame} + N_{bit} \times T_{bit} + \Delta \text{Data Clock Phase} + \Delta \text{Carrier Phase},$$

where $N_{frame}$ is the number of frames traversing the distance between the first terminal 105 and the second terminal 110, $T_{frame}$ is the frame period, $N_{bit}$ is the number of RF data clock bits offset between the presently transmitted frame and the presently received data frame, $T_{bit}$ is the period of the RF data clock, Δ Data Clock Phase is the phase difference between the transmitted RF data clock and the received data clock, and Δ Carrier Phase is the phase difference between the transmitted optical carrier and the received optical carrier.

Figure 4:
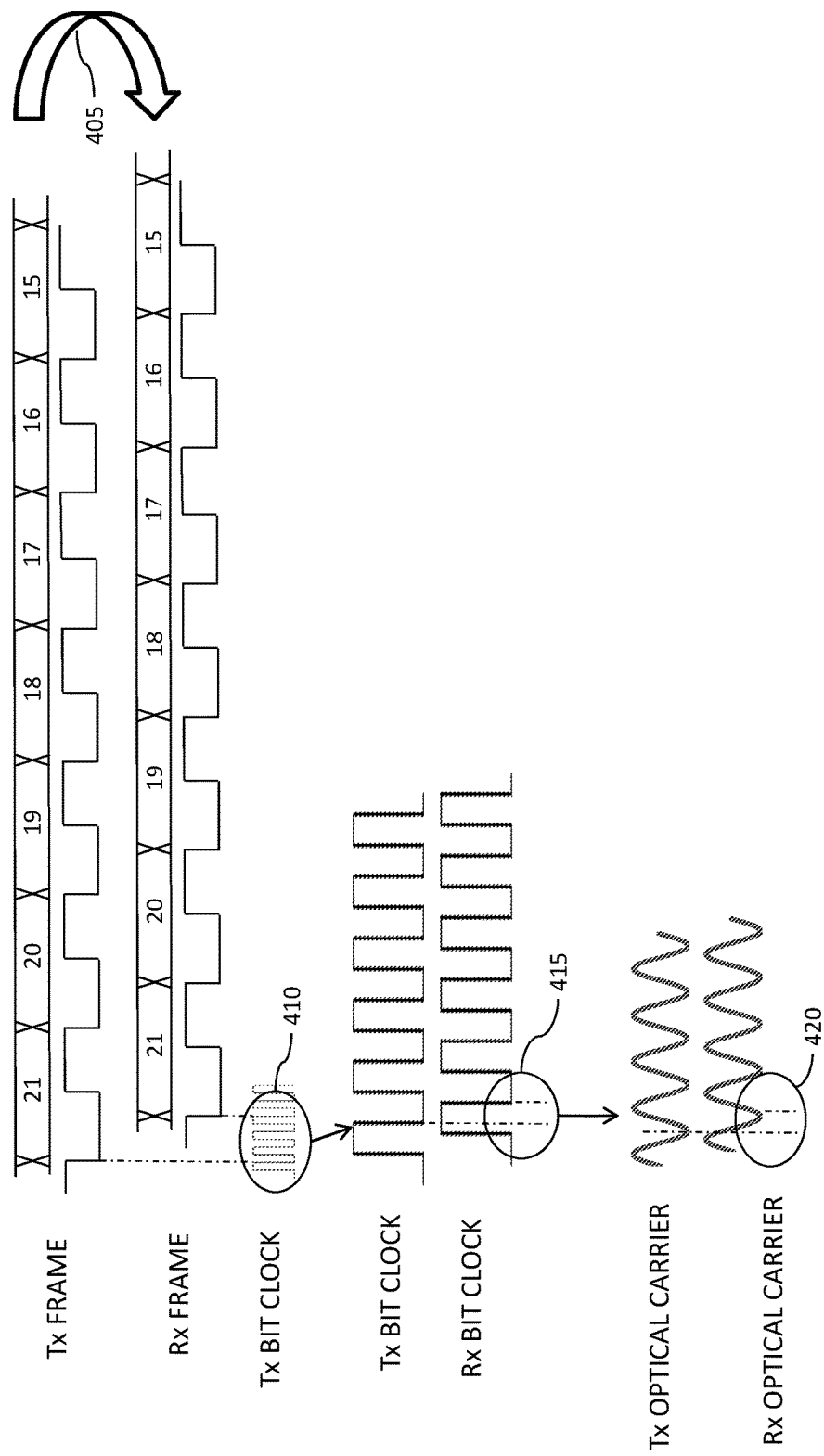
FIG. 4 illustrates exemplary parameters that may be measured by the optical system.

Referring to FIGS. 1 and 4, the frame counter 145 may compare the received data frames recovered by the first clock data recovery circuit 140 with the data frames generated by the data source 120 and may determine the number of data frames traversing the distance between the first terminal 105 and the second terminal 110 (405 FIG. 4). The number of data frames traversing the distance between the first terminal 105 and the second terminal 110 may provide an exemplary measure of the distance between the first and second terminals within a few hundred meters.

The frame bit counter 150 may determine the number of data clock bits offset between the presently transmitted frame and the presently received frame (410 FIG. 4). The determination of the number of data clock bits offset between the presently transmitted frame and the presently received frame may provide further precision of the measurement of the distance between the first and second terminals 105, 110 to within approximately 30 centimeters.

The data clock phase detector 155 may compare the phase difference between the transmitted RF data clock from the RF frequency synthesizer 115 and the received RF data clock from the first clock data recovery circuit 140 and may utilize the data clock phase difference (415 FIG. 4) to provide still further precision of the measurement of the distance between the first and second terminals 105, 110 to within approximately 50 micrometers.

The optical carrier phase detector 160 may compare the phase difference between the transmitted optical carrier from the optical frequency synthesizer 125 and the optical carrier received by the first optical receiver 135 and may utilize the optical carrier phase difference (420 FIG. 4) to provide even further precision of the measurement of the distance between the first and second terminals 105, 110 to within approximately 60 nanometers.

The disclosed embodiments thus provide high precision optometric range and ranging measurements which may be advantageous for various applications, for example, space navigation and communications, gravitational based science missions, and also may combine optometric communications and optometric measurements on a single platform.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. An apparatus for measuring a distance between a first and second terminal comprising:
   a frame counter for determining a number of data frames traversing a distance between the first terminal 105 and the second terminal;
   a frame bit counter for determining a number of data clock bits offset between a transmitted data frame and a concurrently received data frame;
   a data clock phase detector for determining a phase difference between an RF data clock for the transmitted data frame and an RF data clock for the concurrently received data frame; and
   an optical carrier phase detector for determining a phase difference between an optical carrier used to transmit the transmitted data frame and an optical carrier for the concurrently received data frame,
   wherein the distance between the first and second terminal is determined from a round trip transit time T between the first and second terminals expressed as:

$$T = N_{frame} \times T_{frame} + N_{bit} \times T_{bit} + \Delta \text{Data Clock Phase} + \Delta \text{Carrier Phase},$$

where $N_{frame}$ is the number of frames traversing the distance between the first terminal 105 and the second terminal 110, $T_{frame}$ is the frame period, $N_{bit}$ is the number of RF data clock bits offset between the presently transmitted frame and the presently received data frame, $T_{bit}$ is the period of the RF data clock, Δ Data Clock Phase is the phase difference between the transmitted RF data clock and the received data clock, and Δ Carrier Phase is the phase difference between the transmitted optical carrier and the received optical carrier.

2. The apparatus of claim 1, comprising an RF frequency synthesizer for generating the RF data clock.

3. The apparatus of claim 1, comprising a pattern generator for generating data for the data frames.

4. The apparatus of claim 1, comprising a source of communication data for generating data for the data frames.

5. The apparatus of claim 1, comprising an optical frequency synthesizer for generating the optical carrier.

6. The apparatus of claim 1, wherein the optical carrier is a coherent optical communications carrier.

7. The apparatus of claim 1, wherein the first terminal is a ground terminal and the second terminal is a space terminal.

8. The apparatus of claim 1, wherein the first and second terminals are located on different space craft.

9. The apparatus of claim 1, wherein the first and second terminals are located on different terrestrial bodies.

10. A method for measuring a distance between a first and second terminal comprising:
    determining a number of data frames traversing a distance between the first terminal 105 and the second terminal;
    determining a number of data clock bits offset between a transmitted data frame and a concurrently received data frame;
    determining a phase difference between an RF data clock for the transmitted data frame and an RF data clock for the concurrently received data frame;
    determining a phase difference between an optical carrier used to transmit the transmitted data frame and an optical carrier for the concurrently received data frame; and
    calculating the distance between the first and second terminal from a round trip transit time T between the first and second terminals expressed as:

$T = N_{frame} \times T_{frame} + N_{bit} \times T_{bit} + \Delta \text{Data Clock Phase} + \Delta \text{Carrier Phase},$ where $N_{frame}$ is the number of frames traversing the distance between the first terminal 105 and the second terminal 110, $T_{frame}$ is the frame period, $N_{bit}$ is the number of RF data clock bits offset between the presently transmitted frame and the presently received data frame, $T_{bit}$ is the period of the RF data clock, Δ Data Clock Phase is the phase difference between the transmitted RF data clock and the received data clock, and Δ Carrier Phase is the phase difference between the transmitted optical carrier and the received optical carrier.

11. The method of claim 10, comprising generating the RF data clock using an RF frequency synthesizer.

12. The method of claim 10, comprising generating data for the data frames using a pattern generator.

13. The method of claim 10, comprising generating data for the data frames using a source of communication data.

14. The method of claim 10, comprising generating the optical carrier using an optical frequency synthesizer.

15. The method of claim 10, wherein the optical carrier is a coherent optical communications carrier.

16. The method of claim 10, comprising locating the first terminal terrestrially and locating the second terminal in space.

17. The method of claim 10, comprising locating the first and second terminals on different space craft.

18. The method of claim 10, comprising locating the first and second terminals on different terrestrial bodies.

* * * * *